April 12, 1932.  E. ALBAUGH  1,853,489
ROTARY COTTON CHOPPING CUTTER
Filed March 17, 1930   2 Sheets-Sheet 1
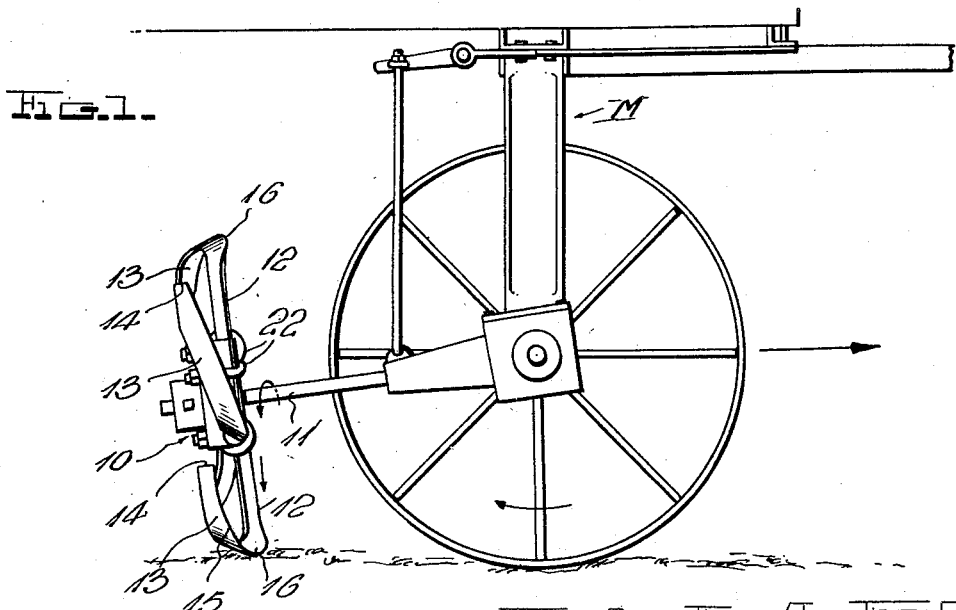
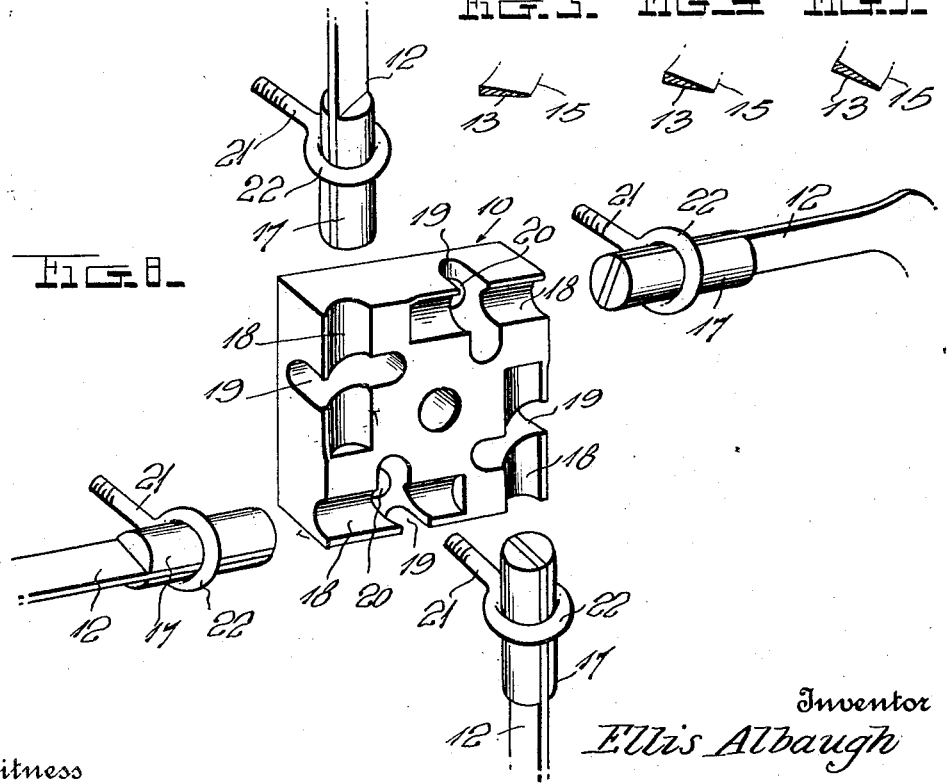
Witness
H. Woodard
Inventor
Ellis Albaugh
By H. B. Wilson & Co.
Attorneys April 12, 1932.  E. ALBAUGH  1,853,489
ROTARY COTTON CHOPPING CUTTER
Filed March 17, 1930  2 Sheets-Sheet 2
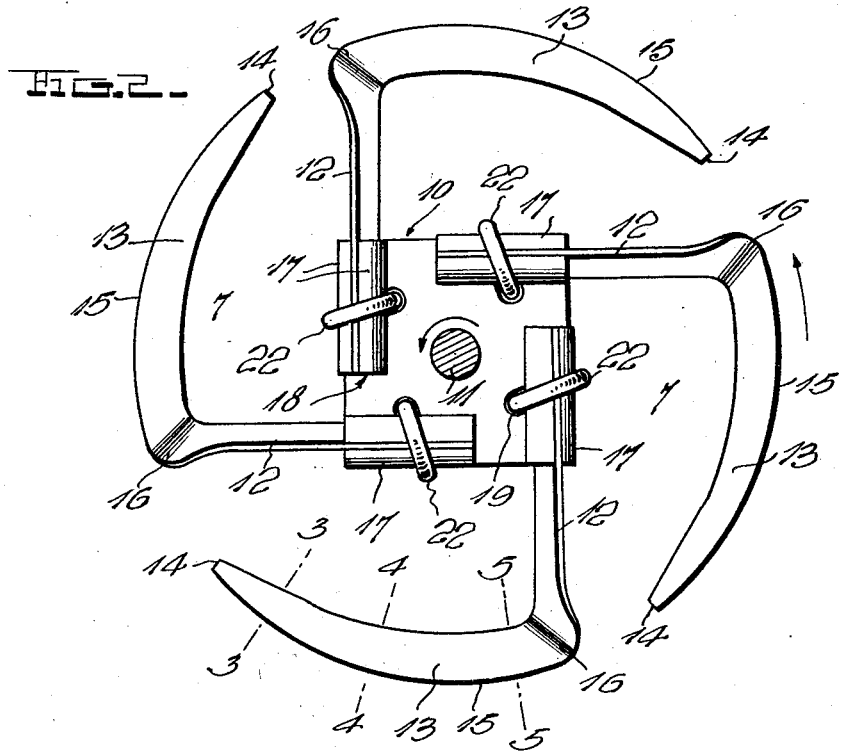
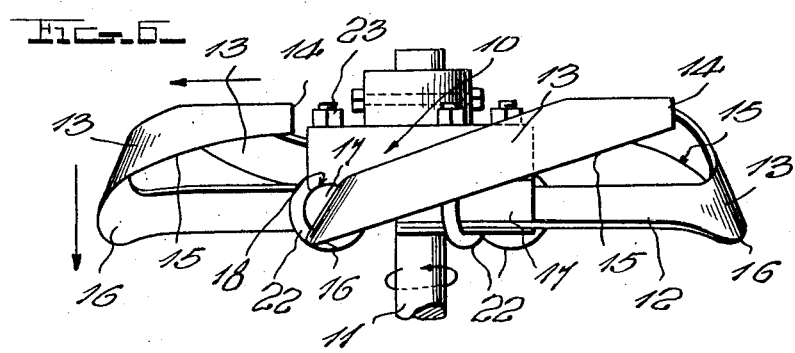
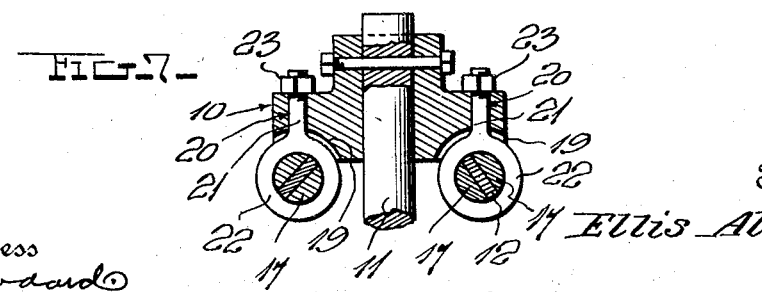
Inventor
Ellis Albaugh
Witness
H. Woodard
By H. Q. Wilson Yeo
Attorneys Patented Apr. 12, 1932

1,853,489

UNITED STATES PATENT OFFICE

ELLIS ALBAUGH, OF SAN ANTONIO, TEXAS, ASSIGNOR TO DIXIE COTTON MACHINERY COMPANY, OF SAN ANTONIO, TEXAS, A CORPORATION OF DELAWARE

ROTARY COTTON CHOPPING CUTTER

Application filed March 17, 1930. Serial No. 436,619.

This invention aims to provide a new and improved rotary cutter for use on cotton chopping machines and of such nature as to be unusually efficient, relying both upon the rotation of the cutter and the forward movement of the machine for effecting a shearing cut and consequently requiring a minimum of power for its operation.

A further object is to provide a cutter which will produce a loose mulch between the cotton stalks left standing and will throw a quantity of the loosened earth around said stalks, thereby hastening their growth.

A still further object is to provide novel means for securing carrying arms for the cutting blades, to the hub of the cutter.

With the foregoing and minor objects in view, the invention resides in the novel subject matter hereinafter described and claimed, description being accomplished by reference to the accompanying drawings.

Fig. 1 is a side elevation of a portion of a cotton chopping machine embodying the improved cutter, the latter being shown in lowered position.

Fig. 2 is a front elevation of the cutter, its carrying shaft being in section.

Figs. 3, 4 and 5 are detail sectional views through one of the blades as indicated by lines 3—3, 4—4 and 5—5 of Fig. 2, showing the longitudinal twist which exists in connection with each blade.

Fig. 6 is an upper edge view of the cutter in the position shown in Fig. 2.

Fig. 7 is a sectional view as indicated by the irregular line 7—7 of Fig. 2.

Fig. 8 is a fragmentary disassembled perspective view.

The construction which has been illustrated in the drawings, has proven highly efficient and desirable from all standpoints, and may therefore be considered as preferred, it being understood however that within the scope of the invention as claimed, minor variations may be made.

The cutter embodies a hub 10 adapted for mounting on a driven shaft 11 forming part of a cotton chopping machine M, the plane of rotation of the cutter being transverse to the line of movement of the machine. Blade-carrying arms 12 are secured to and project from the periphery of the hub 10, the outer ends of these arms being equipped with curved, circumferentially spaced, substantially concentric and helically pitched blades 13 which retreat rearwardly from their leading ends 16. In the present showing, the leading ends 16 of the blades 13 are integral with the outer ends of the arms 12 and by referring to said ends 16 as leading ends, I mean that they are first to penetrate the earth. Each of the blades 13 is provided with a sharpened front edge 15 which, due to the helical pitching of the blades is oblique to the plane in which the cutter rotates as will be clear from Figs. 1 and 6. The leading or entering end 16 is rounded, curves toward the hub 10 and is integral with the outer end of arm 12, and the edge 15 extends uninterruptedly along said rounded end and to the free trailing end of the blade. The end 16 protects the remainder of the blade against blows and foreign matter and will not collect vegetable growth.

The cutter enters the ground at point 16 and as the machine moves forward, the successive points of the cutting edge 15 travel at such a speed and angle that the resultant cutting points act in a slicing motion, giving much the same action as the sliding sweeping slice of a properly swung scythe. That is, the rearward angle of the cutting edge 15 traveling in a transverse circle has a circumferential movement and gives a slicing action in which the cutting points 16 lead the successive points on the blades 15 to the points 14.

Adjusting means at the eye-bolts 12 in which friction blocks 17 are used together with the blade-carrying arms 12, allow said arms 12 to be turned in sockets 18, a forward or rearward arc movement of free point 14 of the cutting blade being thus effected.

By a forward or rearward setting of the point 14, a lesser or greater free uncut space is obtained which will give any desired stand or uncut growth of the plants in the rows. These blades enter the ground with as little resistance as possible creating a pulverized condition of the top soil and are self-cleaning and self-sharpening. In addition to performing a cutting function, the blades will loosen the earth, travel under the loosened earth and allow the latter to fall behind said blades, producing an effective mulch.

In the present showing, the arms 12 are flat, and at their inner ends, substantially semi-cylindrical blocks 17 of hard wood or other desired material, are applied against opposite sides of said arms, providing cylindrical constructions which are partially received in grooves 18 formed in one end of the hub 10, the hub being preferably polysided and the grooves disposed along the sides thereof as shown most clearly in Fig. 8. The hub 10 is in the present showing, provided with other grooves 19 transverse to the grooves 18, and with openings 20 leading from the grooved end of the hub to the opposite end thereof. Bolts 21 are received in these openings and are provided with yokes 22 which engage the inner ends of the arms 12 and the blocks 17 and hence clamp these parts tightly in the grooves 18. The outer portions of the yokes 22 are received in the grooves 19 and hence turning of the bolts 21 is prevented, upon tightening of their nuts 23, or upon loosening of said nuts.

The construction above described, not only forms effective means for attaching the arms 12 to the hub 10, but by loosening the nuts 23, the blocks 17 and arms 12 may turn, allowing positioning of the blades 13 at any desired angular relation with the plane of rotation of the cutter as a whole.

It will be seen from the foregoing that although the invention is of rather simple and inexpensive nature, it will be highly efficient and desirable. Attention is again invited to the fact that variations may be made within the scope of the invention as claimed, even though the preferred structure has been disclosed and specifically described.

These drawings and specifications have covered the operation of the cutter head as set in the rear of the land wheels. It is desired also that these specifications shall cover this cutter head as set in a forward position of the land wheels, in which position the cutter head shall operate as above described.

I claim:

1. A cotton chopping cutter intended to rotate in a plane transverse to a row of cotton, said cutter comprising a hub, an arm projecting rigidly from the periphery of said hub, a curved helically pitched blade having a rounded entering end which curves toward said hub and is secured to the outer end of said arm, said rounded entering end protecting the remainder of the blade from blows and foreign matter, said blade having a free trailing end and being formed with a front cutting edge extending along said rounded entering end and continuing throughout the length of the blade, said edge receding rearwardly from said entering end of said blade to said free end of the latter.

2. A cotton chopping cutter intended for rotation in a plane transverse to a row of cotton, said cutter comprising a hub, an arm projecting from the periphery of said hub, a helically pitched blade carried by the outer end of and rigidly attached to said arm, and adjusting means comprising a U-bolt and friction block for securing said arm to said hub and allowing turning of the former to vary the angular position of said blade with regard to the plane of rotation of the cutter.

3. A rotary cutter comprising a hub having a groove in one end, one end of said groove opening through the periphery of the hub, said hub also having an opening from its other end to said groove, a cutter-carrying arm having one end received in said groove, said arm being turnable about an axis unidirectional with its length, and a bolt passing through said opening and having a yoke receiving said arm, said bolt and yoke being adapted for holding said arm in said groove, regardless of the position to which the arm be turned.

4. A rotary cutter comprising a hub having a groove in one end, one end of said groove opening through the periphery of the hub, said hub also having an opening from its other end to said groove, a flat cutter-carrying arm, two substantially semi-cylindrical blocks lying against opposite sides of said arm, said blocks and arm lying partially within said groove, and a bolt passing through said opening, said bolt having a yoke co-operating with said groove in surrounding and clamping said blocks and arm.

5. In a device of the class described, a body having a groove in one side and an opening leading from said groove to its opposite side, a member lying within said groove, said member being turnable about an axis uni-directional with its length, and a bolt passing through said opening and having a yoke receiving said member, said bolt and yoke being adapted for holding said member in said groove regardless of the position to which said member be turned.

6. In a device of the class described, a body having a groove in one side and an opening from said groove to its opposite side, a flat member, two substantially semi-cylindrical blocks applied to opposite sides of said member and forming a cylindrical construction which is partially received in said groove, and a bolt passing through said opening and having a yoke co-operable with said groove in clamping said cylindrical construction.

In testimony whereof I have hereunto affixed my signature.

ELLIS ALBAUGH.